(12) United States Patent
Biskeborn et al.

(10) Patent No.: US 9,053,108 B2
(45) Date of Patent: Jun. 9, 2015

(54) FILE SYSTEM EXTENDED ATTRIBUTE SUPPORT IN AN OPERATING SYSTEM WITH RESTRICTED EXTENDED ATTRIBUTES

(71) Applicant: International Business Machines Corporation, Armonk, NY (US)

(72) Inventors: Brian Biskeborn, Mountain View, CA (US); Tohru Hasagawa, Kanagawa (JP); David A. Pease, Redwood Estates, CA (US); Michael A. Richmond, Mountain View, CA (US); Anurag Sharma, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/759,223

(22) Filed: Feb. 5, 2013

(65) Prior Publication Data

US 2014/0222876 A1    Aug. 7, 2014

(51) Int. Cl.
*G06F 17/30* (2006.01)

(52) U.S. Cl.
CPC .... *G06F 17/30067* (2013.01); *G06F 17/30129* (2013.01); *G06F 17/3007* (2013.01); *G06F 17/30115* (2013.01); *G06F 17/30141* (2013.01)

(58) Field of Classification Search
CPC .......... G06F 17/3007; G06F 17/30115; G06F 17/30129; G06F 17/30141
USPC .......................................... 707/822
See application file for complete search history.

(56) References Cited

U.S. PATENT DOCUMENTS

| 5,412,808 | A | 5/1995 | Bauer |
| 5,579,517 | A * | 11/1996 | Reynolds et al. ..................... 1/1 |
| 5,617,568 | A | 4/1997 | Ault et al. |
| 5,926,805 | A | 7/1999 | Hurvig et al. |
| 6,038,379 | A | 3/2000 | Fletcher et al. |
| 6,735,700 | B1 * | 5/2004 | Flint et al. ....................... 726/24 |
| 6,871,245 | B2 | 3/2005 | Bradley |
| 7,587,402 | B2 | 9/2009 | Muhlestein |
| 2003/0009449 | A1 * | 1/2003 | Grubbs et al. .................... 707/3 |
| 2003/0046578 | A1 * | 3/2003 | Brown et al. ................. 713/200 |
| 2006/0277153 | A1 | 12/2006 | Mason et al. |

(Continued)

OTHER PUBLICATIONS

Kuenning, CS135 Fuse Documentation, 2010.*

(Continued)

*Primary Examiner* — William Spieler
(74) *Attorney, Agent, or Firm* — Cantor Colburn LLP; Yusuke Kanehira

(57) ABSTRACT

Embodiments of the invention relate to providing file system extended attribute support in an operating system. A request from an application to access extended attribute data in a multi-platform file system using an interface specified by the operating system is received. It is determined whether the specified interface supports an exchange of full content of the extended attribute data between the application and the multi-platform file system. Based on determining that the specified interface does not support an exchange of full content, the request is processed by an alternate interface. Based on the access being a read, the full content of the extended attribute data is retrieved and returned to the application using the alternate interface. Based on the access being a write, the full content of the extended attribute data is received from the application using the alternate interface and written to the multi-platform file system.

20 Claims, 4 Drawing Sheets

(56) References Cited

U.S. PATENT DOCUMENTS

| | | |
|---|---|---|
| 2008/0065698 A1 | 3/2008 | French et al. |
| 2009/0265302 A1 | 10/2009 | Sudhakar |
| 2012/0179730 A1* | 7/2012 | Slegers et al. .................. 707/822 |
| 2012/0331021 A1* | 12/2012 | Lord .............................. 707/826 |
| 2013/0132663 A1* | 5/2013 | Eleftheriou et al. ........... 711/111 |

OTHER PUBLICATIONS

Childers et al., Developments in the Realization of Practical File-Based Workflow Environments, SMPTE 2012.*

Archiware Blog, LTFS Reality Check, 2012.*

Russon et al., NTFS Documentation, 2010.*

Pease et al., The Linear Tape File System, 2010.*

StorageNewsletter.com, Cache-A Introduces LTFS Across LTO-5 Product Line, May 25, 2011.*

IBM, Linear Tape File System (LTFS) Format Specification, Apr. 2010.*

F. Revol et al., "Universal File System Extended Attributes Namespace." Proc. Int'l Conf. on dublin Core and Metadata Applications, 2011, pp. 69-73.

* cited by examiner

US 9,053,108 B2

FILE SYSTEM EXTENDED ATTRIBUTE SUPPORT IN AN OPERATING SYSTEM WITH RESTRICTED EXTENDED ATTRIBUTES

BACKGROUND

The present invention relates generally to file system extended attributes, and more specifically, to supporting file system extended attributes in an operating system with restricted extended attributes.

File systems are used to organize data expected to be retained after a program terminates by providing procedures to store, retrieve, and update data as well as procedures to manage the available space on the storage devices that contain the data. Typically file systems organize data in an efficient manner that is tuned to the specific characteristics of the storage devices. In addition, file systems provide mechanisms to control access to the data and metadata. Metadata is a type of bookkeeping information that is associated with a file such as the time that the file was last modified, the file creation time, the time the file was last accessed, the time the file metadata was changed, the time the file was last backed up, the file owner, and/or the access permission settings (e.g., whether the file is read-only, executable, etc.). Generally, metadata is used by the file system and has a purpose that is strictly defined by the file system.

File system extended attributes associated with a file include user defined attributes such as an author of the file, a character encoding of the file, a checksum of the file, and/or the size of an image in the file. File system extended attributes typically contain data used by the applications that access the file.

BRIEF SUMMARY

Embodiments are directed to methods and computer program products for providing file system extended attribute support in an operating system. A request to access extended attribute data in a multi-platform file system is intercepted. The access is by an interface specified by the operating system. The request is from an application executing on the operating system. It is determined whether the interface specified by the operating system supports an exchange of full content of the extended attribute data between the application and the multi-platform file system. Based on determining that the interface specified by the operating system does not support an exchange of full content of the extended attribute data between the application and the multi-platform file system, the request is processed by an alternate interface. Based on the access being a read access, the full content of the extended attribute data is retrieved from the multi-platform file system, and returned to the application using the alternate interface. Based on the access being a write access, the full content of the extended attribute data is received from the application using the alternate interface and written to the multi-platform file system.

Another embodiment is directed to a method for providing file system extended attribute support in an operating system. The method includes intercepting a request, from an application executing on the operating system, to access extended attribute data in a linear tape file system (LTFS). The access is by an interface specified by the operating system. The access is at least one of a read and a write, and the extended attribute data includes extended attribute names and associated extended attribute values. It is determined whether the interface specified by the operating system supports an exchange of full content of the extended attribute names between the application and the LTFS. Based on determining that the interface specified by the operating system does not support an exchange of full content of the extended attribute names between the application and the LTFS, the request is processed by an alternate interface. Based on the access being a read, the full content of the extended attribute names are retrieved from the LTFS, the full content of the extended attribute names and associated extended attribute values are inserted into an alternate data stream (ADS), and the ADS is presented to the application. Based on the access being a write, the ADS including the full content of the extended attribute names is received from the application, and the full content of the extended attribute names and associated extended attribute values in the ADS are written to the LTFS.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
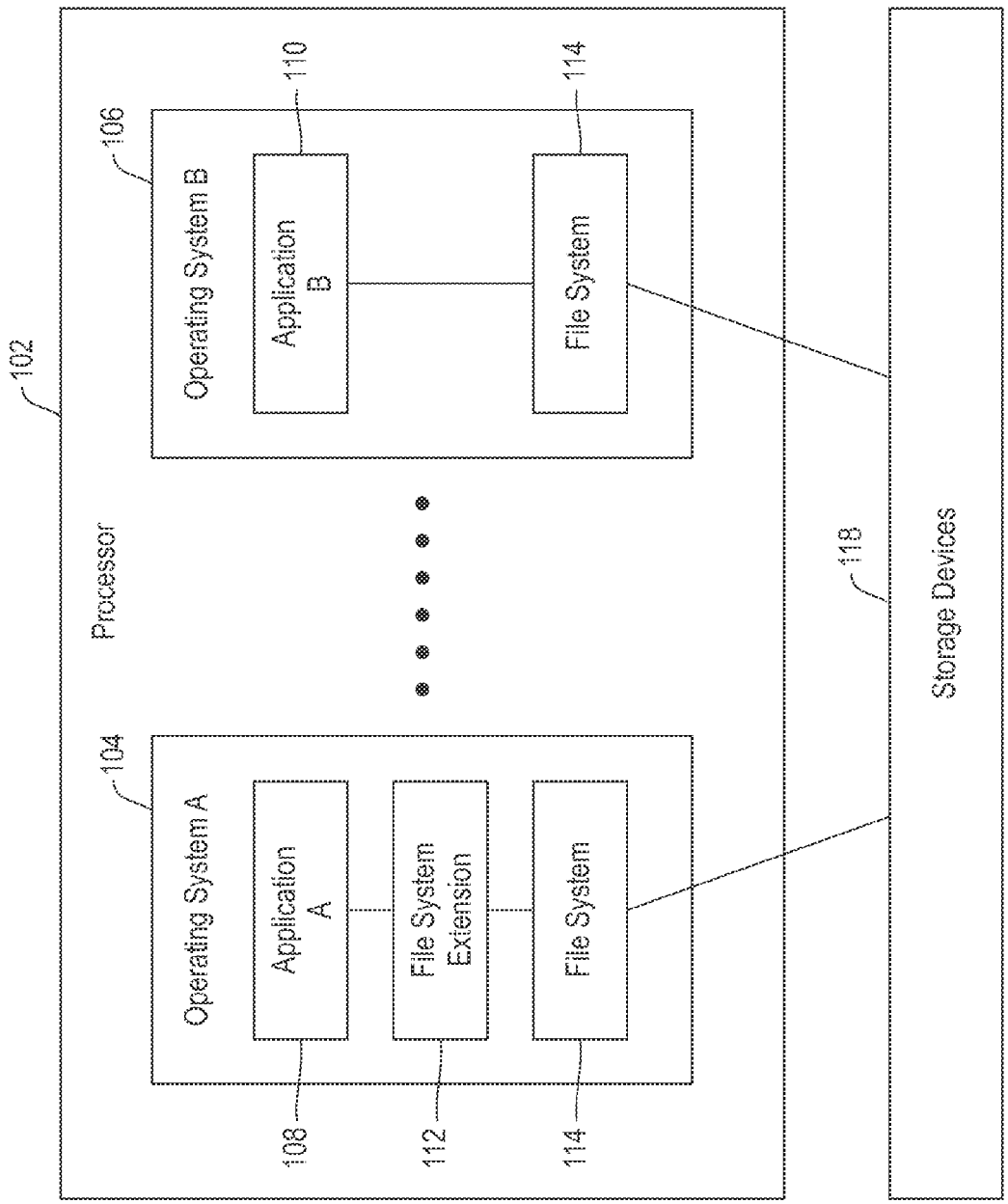
FIG. 1 depicts a system for file system extended attribute support in an operating system with restricted extended attributes in accordance with an embodiment.

Embodiments described herein provide support for file system extended attributes in operating systems with restricted extended attributes. Embodiments may be used by multi-platform file systems to preserve extended attributes when files are manipulated (e.g., created, copied, restored) by two or more operating systems having different extended attribute specifications. Example multi-platform file systems include the linear tape file system (LTFS) and the IBM® General Parallel File System (GPFS™).

Application programming interfaces (APIs) to access file system extended attributes are available on most mainstream operating systems today, such as, but not limited to Linux®, Mac OS®, and Microsoft® Windows®. However, on different operating systems these API's often have different specifications for the format and length of supported extended attribute names and values. In addition, some file system extended attribute name and value specifications are not compatible with the extended attribute specification of the native API of certain operating systems, and applications running on these operating systems have no way of accessing these incompatible extended attributes. Therefore, if an extended attribute specification of a multi-platform file system does not conform to the extended attribute specification of one or more operating systems, then extended attribute data loss will occur when the files are read and copied by the non-conforming operating system(s).

As used herein the term "non-conforming operating system" refers to an operating system that processes extended attributes in a manner that is incompatible with (e.g., shorter length and/or different format) the extended attributes created by the file system, thus causing a loss of extended attribute data. As used herein the term "conforming operating system" refers to an operating system that supports extended attributes that are compatible with the extended attributes created by the file system, thus allowing access to content of the extended attribute data in the file system. As used herein, the term "restricted extended attributes" refers to the extended attributes created by the non-conforming operating system.

For example, the LTFS supports extended attribute names that include up to 255 unicode code points, which translates into LTFS extended attribute names that are up to 1024 bytes in length. In contrast, Windows supports extended attribute names made up of ASCII strings having a maximum of 255 characters, which translates into Windows extended attribute names of up to 255 bytes in length. In this example, restricted extended attributes are created by the non-conforming operating system Windows.

Given the above constraints, the following scenarios may cause loss of extended attribute data when a tape formatted with LTFS is accessed from applications running on different operating systems. In one scenario, an application executing on a Linux operating system platform creates a file on a tape along with extended attributes of the file using LTFS (where Linux LTFS supports extended attribute names of 255 unicode code points where each code point may be up to 4 bytes), the tape is then mounted on a system running Windows, and an application copies the file to a new location using Windows LTFS. In an embodiment, Windows LTFS uses the Windows CopyFile API which does not support extended attributes of the same length and format as LTFS. In this scenario, the extended attributes are not copied correctly (e.g., extended attribute names longer than 255 bytes are lost) because the LTFS extended attribute namespace cannot be exposed through the Windows system calls.

In a second scenario, the user also creates extended attributes on a file in Linux, and the tape is then mounted on a system running Windows. However, in this second scenario, the Windows Backup API is used to migrate the file to another storage area (e.g., an archival storage system or archival storage area) and extended attributes are not written correctly to the backup image because the Windows Backup API uses the standard Windows system calls to access the extended attributes. In the backup scenario, the backup file is created in the Windows operating system and thus will not contain extended attribute names longer than 255 bytes (i.e., the extended attributes are restricted extended attributes). Therefore, the extended attribute names longer than 255 bytes are lost and when the backup file is restored (by any operating system) it will not contain any extended attribute names longer than 255 bytes.

In addition, having incompatible character sets for the name of the extended attributes may also result in incorrect extended attributes. For example, Unicode strings (e.g., with 16 bit characters) will not map correctly into ASCII strings (e.g., 8 bit characters with every other byte having a null value). In this case, even if the extended attribute value specification of the file system supports extended attributes of the same lengths than what is supported by one or more operating systems, the system extended attribute data will not get preserved correctly by non-conforming operating systems.

Embodiments described herein preserve full extended attribute data when a file is copied or backed-up by a non-conforming operating system. It is noted that the extended attributes may not be usable by an application executing on the non-conforming operating system. However, if a file "A" with extended attributes is copied to a file "B" by a non-conforming operating system, then the extended attributes on file "B" will be usable by an application being executed by a conforming operating system.

Embodiments utilize a shim that is located between, and communicates with, the file system and the operating system to provide an alternate interface between the application and the file system. The shim executes instructions that are referred to herein as a "file system extension." In an embodiment, the shim is implemented using a Windows file system filter driver to intercept requests from the application targeted for the file system. The shim transforms extended attribute query calls from an application to the file system so that full extended attribute data is returned. In addition, the shim transforms extended attribute set calls to the file system so that full extended attribute data is restored. The shim may be implemented using, for example, the Windows file system filter driver framework, or by having a FUSE plugin on Linux or OS X® that acts as an intermediary between an application and the file system.

In other embodiments, instead of using a shim, the extended attributes supplied by the file system are preserved using file system extension code that is directly implemented in the operating system specific portion of the file system.

Turning now to FIG. 1, a system for providing extended attribute support in an operating system with restricted extended attributes in accordance with an embodiment is generally shown. The system shown in FIG. 1 includes a processor 102 with two operating system environments. Operating system A 104 is executing application A 108 and operating system B 106 is executing application B 110. As shown in FIG. 1, operating system B 106 supports the extended attributes of file system 114. Operating system A 104 does not natively support the extended attributes of the file system 114 and a file system extension 112 is executed by operating system A 104 to provide support for the extended attributes of the file system 114. The file system 114 is connected to one or more storage devices 118. The storage devices 118 may be implemented by any storage medium including, but not limited to, hard disk drives (HDDs), flash drives, and/or tapes. In an embodiment, the file system 114 is the LTFS and the storage devices 118 include a large tape library that is shared by multiple hosts. In another embodiment, the file system is the GPFS and the storage devices 118 include a high performance shared disk array.

In an embodiment, file system 114 is the LTFS, operating system B 106 is Linux, and operating system A 104 is Windows. In another embodiment, the file system 114 is the GPFS, operating system B 106 is Linux, and operating system A 104 is Windows. Though shown as a separate block in FIG. 1, the file system extension 112 may be included in the file system 114.

Embodiments are not limited to two different operating system environments per processor. Other embodiments include three or more different operating systems per processor. Additional embodiments include each processor having one or more copies of the same operating system environment and one or more processors accessing the storage devices using the file system. In an embodiment, the processor 102 includes multiple processors each running multiple copies of different operating systems (e.g., via a hypervisor such as VMware®).

Application A 108 and Application B 110 may be any user application, including, but not limited to, a file backup application, a file recovery application, and a virus scanning application.

In an embodiment, such as that shown in FIG. 1, a shim (e.g., file system extension 112) intercepts communications between application A 108 and the file system 114. In this embodiment, operating system A 104 supports the following file system API's: ListEA(names_out) to list extended attributes, QueryEA(name_in, value_out) to query extended attributes, and SetEA(name_in, value_out) to set extended attributes. The file system 114 also supports similar I/O semantics, however the file system 114 extended attribute specification supports longer extended attribute names (and the same size extended attribute values) as operating system A 104.

Figure 2:
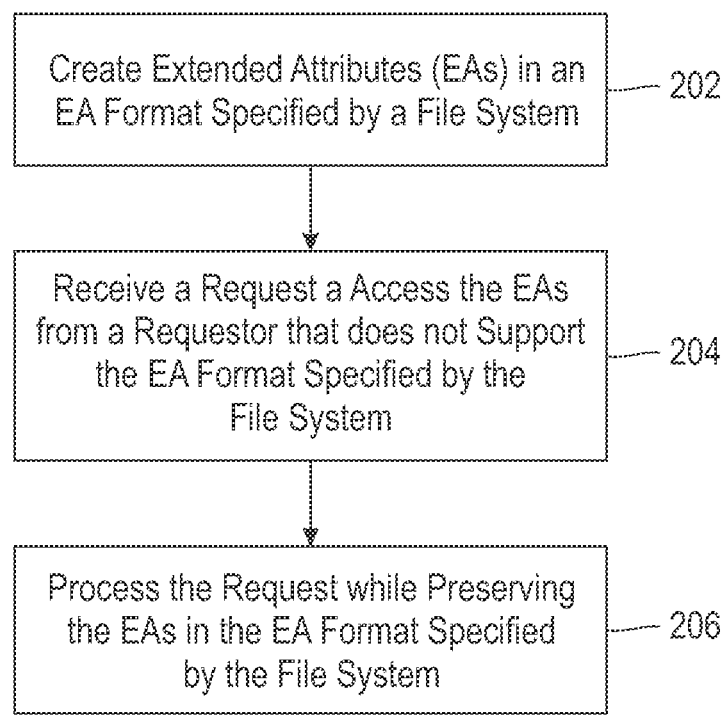
FIG. 2 depicts a process for file system extended attribute support in an operating system with restricted extended attributes in accordance with an embodiment.

Turning now to FIG. 2, a process for file system extended attribute support in an operating system with restricted extended attributes in accordance with an embodiment is generally shown. In an embodiment, block 202 is performed by a file system such as file system 114 in FIG. 1, and blocks 204-206 are performed by a file system extension such as file system extension 112 in FIG. 1. At block 202 of FIG. 2, extended attributes for a file are created in an extended attribute format specified by the file system. At block 204, a request is received to access the extended attributes for the file from a requestor that does not support the format of the extended attributes created in at block 202. For example, the file system is LTFS, the extended attributes for the file are created by an application executing on Linux and the requestor is an application executing on Windows. As described previously, both LTFS and Linux support extended attribute names of up to 1024 bytes and Windows supports extended attribute names of up to 255 bytes. Thus, when compared to LTFS, Windows has restricted extended attributes because of the difference in the specification of the extended attributes names.

At block 206 of FIG. 2, the access request by the non-conforming operating system is processed by an alternate interface that preserves the extended attributes in the format specified by the file system. In embodiments, where the requestor application system is executing on an operating system that supports alternate data streams (ADSs), the request is processed by the file system extension presenting all of the extended attributes of a file residing in the file system as a single ADS. In other embodiments, where the operating system does not support ADSs, the request is processed by the file system extension manipulating the extended attributes in the extended attribute query, list, and set input/output (I/O) paths to and from the file system. The request is processed at block 206 such that there is no extended attribute data loss when the access includes copying the file locally within the file system. Additionally, there no extended attribute data loss when the access includes backing the file up from and then restoring it to the file system when the parameters of the operating system extended attribute list, query and set system calls do not map one-to-one with, and are more restrictive than, the extended attribute specification of the file system.

Figure 3:
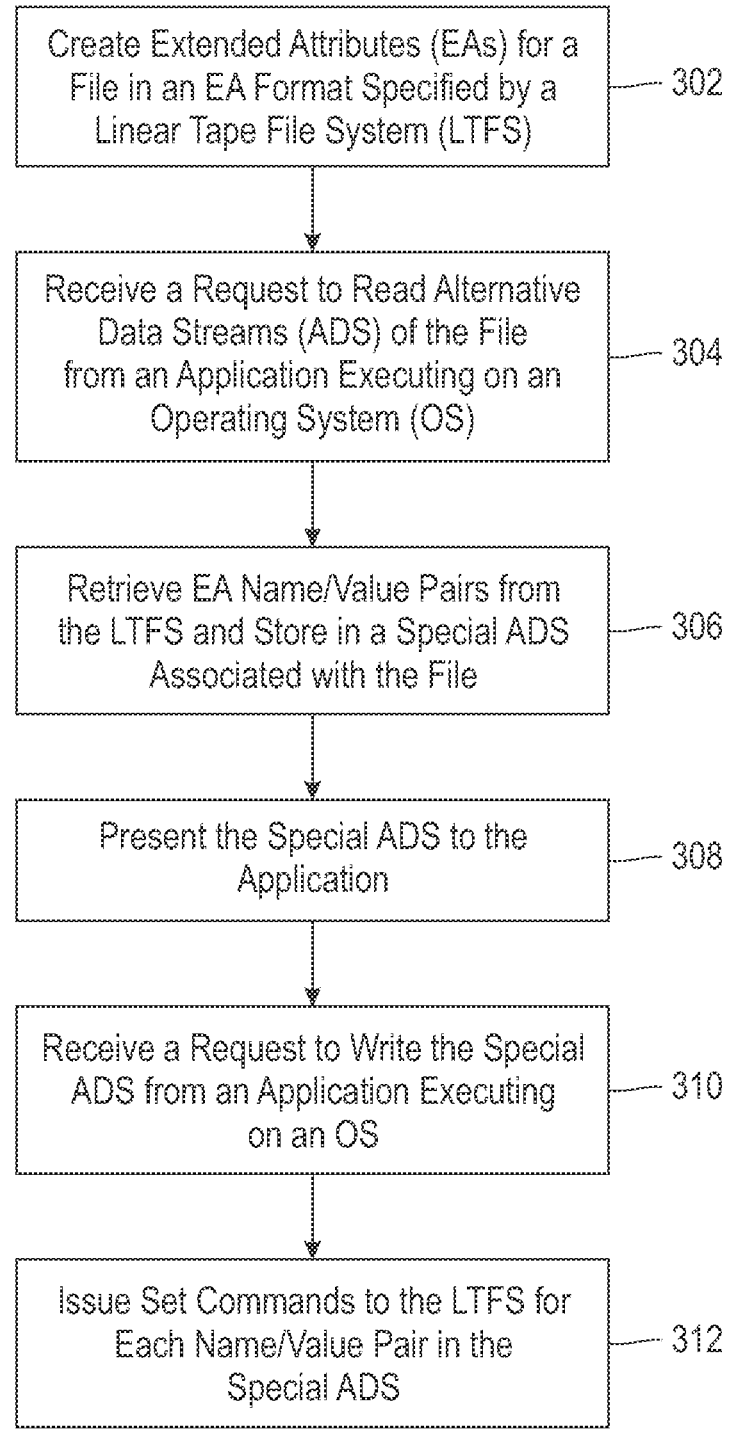
FIG. 3 depicts a process for file system extended attribute support using an alternate data stream in accordance with an embodiment.

Turning now to FIG. 3, a process for file system extended attribute support using an ADS is generally shown in accordance with an embodiment. In an embodiment, block 302 is performed by a file system such as file system 114 in FIG. 1, and blocks 304-312 are performed by a file system extension such as file system extension 112 in FIG. 1. In the process shown in FIG. 3 an ADS is being used as an alternate interface between the application and the file system. At block 302, of FIG. 3, extended attributes for a file are created in an extended attribute format specified by the LTFS. For example, the extended attributes may have been created by an application executing on Linux. At block 304, a request to read the extended attributes for the file is received from an application executing on an operating system, such as Windows (i.e., the requestor does not support the format of the extended attributes created at block 302). In an embodiment, at block 304, the application does an enumeration of ADSs on the file. In an embodiment, the file system extension receives the request at block 304 by intercepting the request from the application to the file system.

At block 306, the file system extension retrieves extended attribute names and associated values from the LTFS and stores them in an ADS associated with the file. In an embodiment, when ADSs are enumerated for a file residing in the LTFS, if the file has extended attributes, then the file system extension appends an additional ADS, to the list of existing ADSs. For example, an ADS having the identifier "EAs_marshalled_stream_<file_system_name_and_version>" may be added to the list of existing ADSs. In another embodiment, the ADS is created based on a request from an application executing in a non-conforming operating system to access the extended attributes of the file for a read access or a write access. At block 306, the "EAs_marshalled_stream_<file_system_name_and_version>" stream is opened on the file for reading, and the file system extension queries the extended attributes for the file from the file system, using, for example a QueryEA( ) call. In an embodiment, a cryptographic or non-cryptographic checksum is appended to each extended attribute name, extended attribute value pair, or tuple, in the stream for further verification during writes. At block 308, the file system extension returns the ADS (or a pointer to the ADS) to the requesting application. In this manner, at blocks 306-308, the file system extension performs an internal query of whether extended attributes are present on the file, and then presents a special ADS to the application that contains all of the extended attribute data.

At block 310, a request to write to the extended attributes is received from an application executing on an operating system having restricted extended attributes. In an embodiment, the file system extension receives the request by intercepting the request from the application to the file system. In an embodiment, the request is initiated based on the application performing a create and write of the special ADS that was enumerated at block 304. In response to receiving the request, the EAs_marshalled_stream_<file_system_name_and_version>" stream of the ADS is opened by the file system extension on the file in LTFS by the application for writing. The file system extension caches the writes until it has a valid extended attribute name, extended attribute pair. In an embodiment part of the validation includes verifying a checksum that succeeds each pair. At block 312, the file system extension issues the appropriate SetEA( ) calls on the file in the LTFS to store the new extended attribute values. In an embodiment, the creation of the special ADS starts the process, in the file system extension, of setting extended attributes on the file.

In an embodiment, blocks 304 through 312 are executed when performing a copy or backup of a file in the file system. In an embodiment that includes only a read of the extended attributes, blocks 304 through 308 are executed. It should be noted that using an ADS as an alternate interface as shown in FIG. 3 may be implemented by an embodiment even when the underling file system does not support ADSs.

Figure 4:
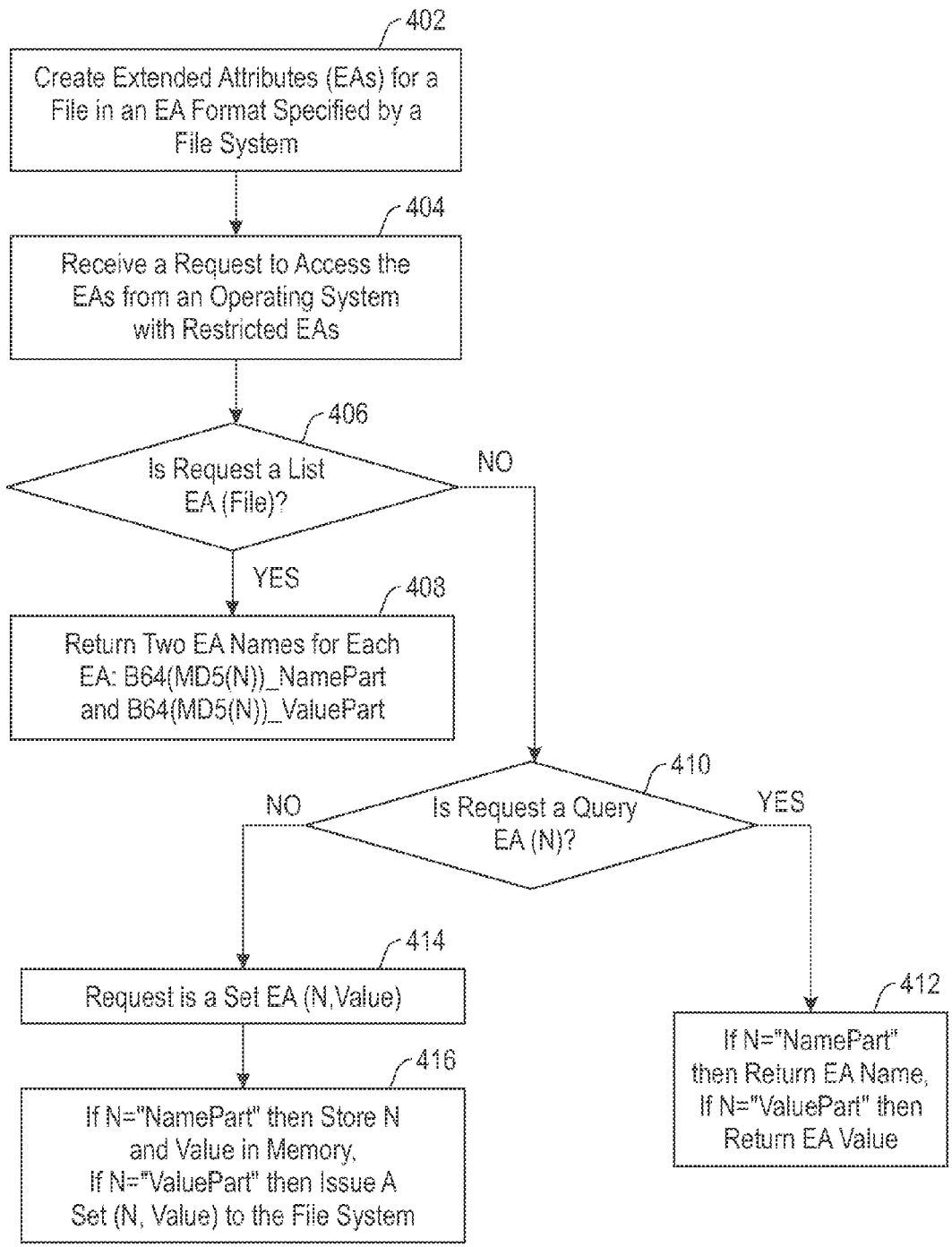
FIG. 4 depicts a process for file system extended attribute support using a conversion process in accordance with an embodiment.

Turning now to FIG. 4, a process for file system extended attribute support using a conversion process is generally shown in accordance with an embodiment. In an embodiment, block 402 is performed by a file system such as file system 114 in FIG. 1, and blocks 404-416 are performed by a file system extension such as file system extension 112 in FIG. 1. At block 402 of FIG. 4, extended attributes for a file are created in an extended attribute format specified by the file system. At block 404, a request to access the extended attributes of the file is received from an application executing on an operating system that does not support the format of the extended attributes created at block 402 (i.e., the operating system has restricted extended attributes). In an embodiment, the file system extension receives the request by intercepting the request from the application to the file system.

At block 406, it is determined if the request is a ListEA(F) call on the file, "F". Block 408 is performed when the request is a ListEA(F) call. The file system extension performs a ListEA(F) call to the file system to get a list of the names of the extended attributes associated with the file. For each extended attribute name received from the file system, the alternate interface used by the file system extension returns two extended attribute names to the application. This embodiment is used in cases where the extended attribute value length supported by the restrictive operating system is long enough to hold the extended attribute name and the extended attribute value of the file system. In an embodiment, the two names returned to the application are "Base64(MD5(N))_namepart", and "Base64(MD5(N))_valuepart", where "N" is the name of the extended attribute. The message digest five (MD5) cryptographic hash algorithm may be replaced with another more collision free cryptographic hash function, as long as the Base64 encoded result fits well within the maximum allowed extended attribute name length.

Block 410 is performed when it is determined at block 406 that the request is not a ListEA(F) call. At block 410, it is determined whether the request is a QueryEA(N) call, where "N" is the name of the extended attribute being queried. Block 412 is performed when the request is a QueryEA(N) call. If N is of the form "<string>_namepart", then the file system extension finds the appropriate extended attribute on the file in the file system by issuing a QueryEA(N) call to the file system with the extended attribute name N. In an embodiment, Base64(MD5(N))==<string> and the file system extension returns the actual extended attribute name to the calling application. If the queried name is of the form "<string>_valuepart", then the file system extension finds the appropriate extended attribute on the file in the file system with the extended attribute name N, where Base64(MD5(N))==<string> and returns the actual extended attribute value to the caller.

Block 414 is performed when it is determined, at block 410, that the request is not a QueryEA(N) call on an extended attribute name. At block 414, it is determined that the request is a SetEA(N, V), where "V" is the value that the attribute N is to be set to. The file system extension checks the name, N, and if the name is of the form "<string>_namepart", then the file system extension keeps the <string>_namepart and value to be set in a hash map that it keeps in memory for that file. If a <string>_valuepart entry already exists in the hash map, then the file system extension sets the extended attribute on the underlying file system. Otherwise when a subsequent SetEA(N,V) call is made with the matching <string>_valuepart as its name, then the file system extension has enough information to set the proper extended attribute name, value pair on the underlying file system. In an embodiment, the dynamically allocated per-file hash map is stored on a local disk for temporary storage (instead of in memory) and it can be deleted when the file system extension receives a Close(F) call for the file.

The embodiments described above assume that the extended attribute value length supported by the file system matches the extended attribute value supported by the operating system. If this is not the case, and the operating system supports shorter extended attribute values, then the above algorithm can be modified as follows. For each extended attribute for a file in the file system, the file system extension will return a sequence of extended attributes for the namepart and a sequence of extended attributes for the valuepart. The namepart extended attribute sequence has names of the form <string>_1_namepart, <string>_2_namepart, . . . , <string>_N_total_namepart, where the last extended attribute name in the sequence denotes how many nameparts there are. The extended attribute valueparts can be handled similarly. Reassembly logic in the file system extension will use the <string>_N_total_namepart and <string>_M_total_valuepart extended attributes to figure out how to extract and assemble the actual extended attribute name and value that should be set on the file in the file system.

In an embodiment where the extended attributes from the file system do not fit in the extended attribute namespace of the operating system (e.g., in the case of LTFS there exist some virtual extended attributes that are documented in the specification), the file system extension can expose those extended attributes directly while performing the processes described in FIGS. 2-4 for all other extended attributes.

In an embodiment where a file which was backed up on an operating system with restricted extended attributes using the process described in FIG. 4 is restored on a different more permissive operating system and file system that does not support the extended attribute specification of the file system, then a tool can be written that identifies the extended attributes that are disassembled by the process described in FIGS. 2-4 and reassembles them properly so that the file is usable on the new more permissive operating system. In an embodiment, in order for reassembly from the process depicted in FIG. 3 to work, the new file system and operating system must support ADS so that the restore can properly preserve the "EAs_marshalled_stream_<file_system_name_and_version>" stream.

The embodiments described herein may be utilized for any ratio between the length of the file system extended attribute name and the length of the operating system extended attribute name.

Technical effects and benefits include the ability to preserve full content of extended attributes in a file system even when the extended attributes are accessed by applications executing on operating systems with restricted extended attributes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to provide file system extended attribute support in an operating system, the method comprising:
   intercepting a request, from an application executing on the operating system, to access extended attribute data in a multi-platform file system, the access by an interface specified by the operating system,
   wherein the interface specified by the operating system does not support an exchange of full content of the extended attribute data between the application and the multi-platform file system; and processing the request by an alternate interface from a file system extension, the processing comprising:

based on the access being a read access, retrieving the full content of the extended attribute data from the multi-platform file system, and returning the full content of the extended attribute data to the application using the alternate interface; and based on the access being a write access, receiving the full content of the extended attribute data from the application using the alternate interface and writing the full content of the extended attribute data to the multi-platform file system.

2. The method of claim 1, wherein the alternate interface includes an alternate data stream.

3. The method of claim 1, wherein the alternate interface includes a hash map.

4. The method of claim 1, wherein the extended attribute data includes an extended attribute name and an extended attribute value for an extended attribute in the multi-platform file system.

5. The method of claim 4, wherein the extended attribute name in the multi-platform file system has a first length that is longer than a maximum extended attribute name length supported by the interface.

6. The method of claim 4, wherein the extended attribute value in the multi-platform file system has a first length that is longer than a maximum extended attribute value supported by the interface.

7. The method of claim 4, wherein at least one of the extended attribute name in the multi-platform file system has a first format that is different than an extended attribute name supported by the interface and the extended attribute value in the multi-platform file system has a second format that is different than an extended attribute value supported by the interface.

8. The method of claim 1, wherein the multi-platform file system is a linear tape file system (LTFS).

9. A method to provide file system extended attribute support in an operating system, the method comprising:

intercepting a request, from an application executing on the operating system, to access extended attribute data in a linear tape file system (LTFS), the access by an interface specified by the operating system, the access at least one of a read and a write, and the extended attribute data including extended attribute names and associated extended attribute values, wherein the interface specified by the operating system does not support an exchange of full content of the extended attribute names between the application and the LTFS; and processing the request by an alternate interface from a file system extension, the processing comprising:

based on the access being a read:
retrieving the full content of the extended attribute names from the LTFS;
inserting the full content of the extended attribute names and associated extended attribute values into an alternate data stream (ADS); and
presenting the ADS to the application; and based on the access being a write:
receiving the ADS from the application, the ADS including the full content of the extended attribute names; and writing the full content of the extended attribute names and associated extended attribute values in the ADS to the LTFS.

10. The method of claim 9, wherein the retrieving includes issuing query commands to the LTFS.

11. The method of claim 9, wherein the writing includes issuing set commands to the LTFS.

12. The method of claim 9, wherein each of the extended attribute names has a first length that is longer than a maximum extended attribute name length supported by the interface.

13. A computer program product for providing file system extended attribute support in an operating system with restricted extended attributes, the computer program product comprising:

a computer readable storage medium having computer readable program code embodied therewith, said program code being executable by a processor to:

intercept a request, from an application executing on the operating system, to access extended attribute data in a multi-platform file system, the access by an interface specified by the operating system, wherein the interface specified by the operating system does not support an exchange of full content of the extended attribute data between the application and the multi-platform file system; and process the request by an alternate interface from a file system extension, the processing comprising:

based on the access being a read access, retrieving the full content of the extended attribute data from the multi-platform file system, and returning the full content of the extended attribute data to the application using the alternate interface; and based on the access being a write access, receiving the full content of the extended attribute data from the application using the alternate interface and writing the full content of the extended attribute data to the file system.

14. The computer program product of claim 13, wherein the alternate interface includes an alternate data stream.

15. The computer program product of claim 13, wherein the alternate interface includes a hash map.

16. The computer program product of claim 13, wherein the extended attribute data includes an extended attribute name and an extended attribute value for an extended attribute in the multi-platform file system.

17. The computer program product of claim 16, wherein the extended attribute name in the multi-platform file system has a first length that is longer than a maximum extended attribute name length supported by the interface.

18. The computer program product of claim 16, wherein the extended attribute value in the multi-platform file system has a first length that is longer than a maximum extended attribute value supported by the interface.

19. The computer program product of claim 16, wherein at least one of the extended attribute name in the multi-platform file system has a first format that is different than an extended attribute name supported by the interface and the extended attribute value in the multi-platform file system has a second format that is different than an extended attribute value supported by the interface.

20. The computer program product of claim 13, wherein the multi-platform file system is a linear tape file system (LTFS).

* * * * *